(12) United States Patent
Olding et al.

(10) Patent No.: US 8,693,457 B1
(45) Date of Patent: *Apr. 8, 2014

(54) DUAL WIMAX RADIO MODEM

(75) Inventors: Doug A. Olding, Overland Park, KS (US); Warren B. Cope, Olathe, KS (US); Shane Robert Werner, Olathe, KS (US); Ahsan Habib, Olathe, KS (US); Arun Santharam, Olathe, KS (US)

(73) Assignee: Clearwire IP Holdings LLC, Bellevue, WA (US)

( * ) Notice: Subject to any disclaimer, the term of this patent is extended or adjusted under 35 U.S.C. 154(b) by 104 days.

This patent is subject to a terminal disclaimer.

(21) Appl. No.: 13/492,588

(22) Filed: Jun. 8, 2012

Related U.S. Application Data

(63) Continuation of application No. 11/736,645, filed on Apr. 18, 2007, now Pat. No. 8,233,466.

(51) Int. Cl.
*H04H 20/67* (2008.01)
(52) U.S. Cl.
USPC ........... 370/339; 370/338; 370/358; 370/391; 370/535; 370/536; 370/542; 370/544; 375/222; 455/13.3; 455/19; 455/82; 455/90.3; 455/344; 455/346; 455/556.1

(58) Field of Classification Search
USPC ......... 370/338, 339, 358, 391, 535, 536, 542, 370/544; 375/222; 455/11.1, 12.2, 13.3, 15, 455/19, 41.2, 82, 90.3, 344, 346, 556.1
See application file for complete search history.

(56) References Cited

U.S. PATENT DOCUMENTS

| | | | | |
|---|---|---|---|---|
| 5,890,077 A | * | 3/1999 | Hanawa et al. | 455/571 |
| 2004/0192222 A1 | * | 9/2004 | Vaisanen et al. | 455/78 |

* cited by examiner

*Primary Examiner* — Hoon J Chung

(57) ABSTRACT

An apparatus and media are provided for more effectively utilizing modems in a WiMAX environment. The apparatus connects a computing device to a network-based information system through at least a first WiMAX modem that is located within the apparatus. A second WiMAX modem can be removably coupled to the apparatus so as to connect the first computing device to the network in combination with the first WiMAX modem. In the event the second WiMAX modem is removed, network connectivity provided by the first WiMAX modem is maintained.

18 Claims, 3 Drawing Sheets

DUAL WIMAX RADIO MODEM

CROSS-REFERENCE TO RELATED APPLICATIONS

This application is a continuation of U.S. patent application Ser. No. 11/736,645, filed Apr. 18, 2007, entitled "Dual WiMAX Radio Modem," the entirety of which is incorporated by reference herein.

STATEMENT REGARDING FEDERALLY SPONSORED RESEARCH OR DEVELOPMENT

Not applicable.

BACKGROUND

Communication across a network-based information system, such as the Internet, is commonplace in most every business and home today. Initially, such communication occurred across a telephone line through a single modem that was linked directly to a single computer. Advancements in technology allowed for communication upgrades through improving data speed by going from a dial-up telephone connection to broadband or Digital Subscriber Line (or Loop) more commonly referred to as DSL. In addition, multiple computers were able to be linked together to provide a data communications link to a network of computers.

More recent developments have allowed a user to locally sever the physical tie to the modem by introducing wireless communications medium known as Wi-Fi. Wi-Fi is a brand originally licensed by the Wi-Fi Alliance to describe the underlying technology of wireless local area networks (WLAN) based on the Institute of Electrical & Electronics Engineers (IEEE) 802.11 specifications. This technology was originally developed to be used for mobile computing devices, such as laptops, in local area networks, but is now increasingly used for more services, including the Internet, VoIP phone access, gaming, and basic connectivity of various consumer electronics. This allows a user with a computer having a wireless transceiver, to send and receive the data from the modem as long as the computer and the Wi-Fi modem are located within a relatively small geographic distance of each other, such as within a house, office building, restaurant, airport, or other confined space.

As the desire for portability of computing devices capable of data exchange continues, internet service providers have developed the next generation of wireless technology, commonly referred to as WiMAX, which is defined as Worldwide Interoperability for Microwave Access by the WiMAX Forum formed to promote conformance and interoperability of the IEEE 802.16 standard. WiMAX is a standards-based technology enabling the delivery of last mile wireless broadband access as an alternative to cable and DSL. Delivering the signal over the "last mile" is the largest cost due to the physical requirements of extending the cabling to each user from a central location or mainline.

Through WiMAX technology, the previously localized wireless internet signal is broadcast over a much larger geographic area, such as an entire metropolitan area. The broadcast of this signal typically occurs by way of radio, television, and/or cellular telephone towers. This allows for wireless data transfer over a much larger area than before and can eliminate the higher costs associated with delivering the signal the "last mile."

To communicate data across an information network in a WiMAX environment for a portable computing device, such as a laptop personal computer, a modem having wireless capability is required. For a laptop personal computer, the modem can be removably coupled to the computer and for a desktop personal computer, the modem is typically a stand alone device that is connected to the computer, typically by way of an Ethernet cable. While each of these devices are effective for their respective type computer, the modem of the laptop personal computer is inactive when the laptop personal computer is turned off. Therefore, this device, which is capable of providing high-speed data transfer with a network, such as the Internet, is an unused computing resource that could be used more effectively.

SUMMARY

The present invention is defined by the claims below. Embodiments of the present invention solve at least the above problems by providing a system and method for, among other things, connecting a computing device wirelessly to a wide-area network-based information system. The present invention has several practical applications in the technical arts including application to both traditionally "fixed" computing devices such as desktop computers used in the home or in a variety of business settings as well as to "portable" computing devices such as a laptop computer or personal digital assistant (PDA).

The present invention seeks to more effectively utilize a modem capable of communicating across a WiMAX network by applying such communication to both fixed and portable computing devices. In a first aspect, computer-readable media have embodied thereon computer-useable instructions for performing a method for communicating data between a computing device and a network-based information system via one or more of a first WiMAX modem and a second WiMAX modem that is removable, where the second WiMAX modem is unavailable when removed. The method includes determining whether the second WiMAX modem is available. When the second WiMAX modem is available, then a first portion of the data is communicated over a first channel via the first WiMAX modem and a second portion of the data is communicated over a second channel via the second WiMAX modem, where the first WiMAX modem and the second WiMAX modem communicate with the network-based information system via at least one antenna. The first channel and the second channel are selectively bonded together to increase bandwidth for communicating the data.

In a second aspect, an apparatus for connecting a computing device to a network is provided. The apparatus includes a first WiMAX modem located within the apparatus, where the first WiMAX modem is configured to connect the computing device to the network over a first channel. The apparatus also includes a second WiMAX modem removably coupled to the apparatus and configured to connect the computing device to the network over a second channel when coupled to the apparatus. The apparatus also includes a controller that can be selectively coupled to the first WiMAX modem and the second WiMAX modem. The controller dynamically selects between using the first WiMAX modem or combining the first WiMAX modem and the second WiMAX modem to connect the computing device to the network. The combining includes apportioning communication data between the first WiMAX modem and the second WiMAX modem. During the combining, when the second WiMAX modem is removed, the computing device remains connected to the network via the first WiMAX modem. The first WiMAX modem and the second WiMAX modem communicate with the network via at least one antenna when the second WiMAX modem is coupled to the apparatus.

Various embodiments and additional features of the present invention will be realized with attention to the attached drawings and following discussion.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for a dual modem apparatus capable of WiMAX communication that comprises a first modem internal to the apparatus and a second modem that is removably coupled to the apparatus. The second modem can be removed from the apparatus and connected to a portable computing device, such as a laptop computer so as to provide WiMAX connectivity to the portable computing device as well. A controller in the apparatus can permit the two modems in the apparatus to be used together to improve the bandwidth and data transfer capability. Alternately, one modem can be selected for use over the other depending on modem capabilities. Furthermore, one modem can establish a secure data transmission channel while the other modem remains on an unsecured data transmission channel.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

Wi-Fi Wireless local area network

WiMAX Worldwide Interoperability for Microwave Access

PDA Personal Digital Assistant Further, various technical terms are used throughout this description. A definition of such terms can be found in Newton's Telecom Dictionary by H. Newton, 22$^{nd}$ Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware.

Figure 1:
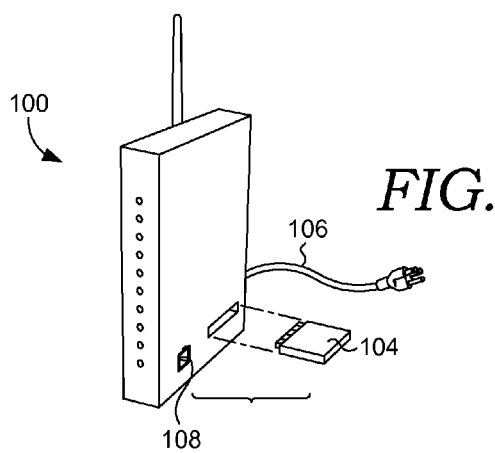
FIG. 1 is a perspective view of the apparatus in accordance with an embodiment of the present invention.
Figure 2:
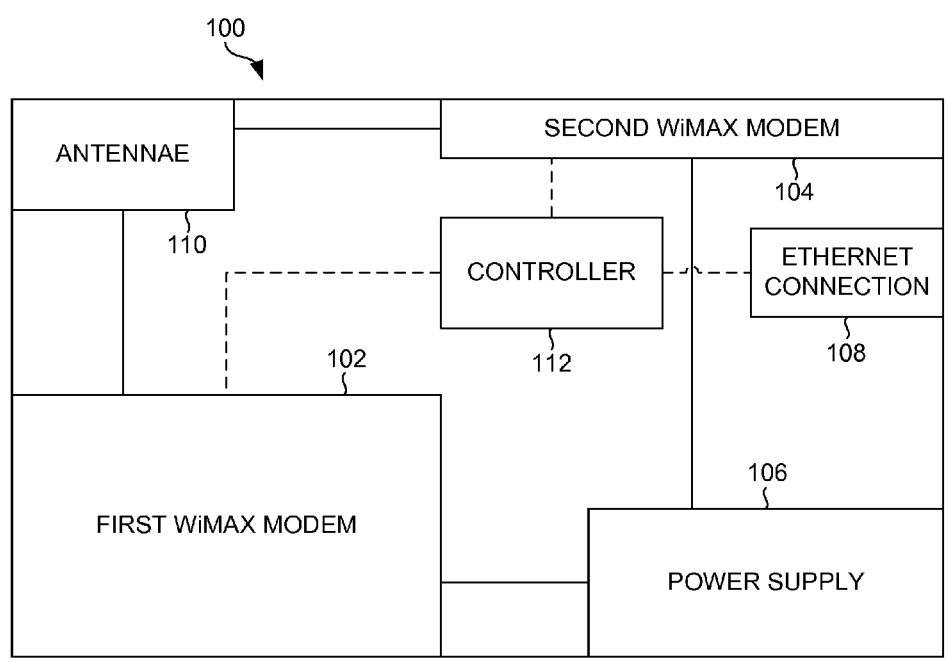
FIG. 2 is a schematic drawing of the components of the apparatus in accordance with an embodiment of the present invention.

Referring to FIG. 1, an apparatus 100 for connecting one or more computing devices to a network-based information system, such as the Internet, is shown. A schematic of the internal components of apparatus 100 is shown in FIG. 2. The apparatus 100 is shown as a stand-alone box-type unit similar in size to a typical cable or DSL modem unit often used today. However, this is only one embodiment of the invention and the apparatus is not to be limited necessarily to this configuration. The apparatus 100 comprises a first WiMAX modem 102 that is located within the apparatus 100 and a second WiMAX modem 104 that is removably coupled to the apparatus 100. A power supply 106 is connected to each of the first and second WiMAX modems 102 and 104. The power supply 106 can be AC power as depicted in FIG. 1 or it could be DC power supplied by a battery. Alternatively, the power supply can be both AC and DC and further include the option of a rechargeable DC battery.

Apparatus 100 also incorporates an Ethernet connection 108 through which an Ethernet cable, such as a Cat. 5 cable can be connected to the apparatus 100. Through this connection, data can be passed to the apparatus 100 from a computing device and visa versa. Typical data transfer through a Cat. 5 Ethernet cable can be up to 1 Gbps. The apparatus 100 also comprises at least one antenna 110 that is coupled to the first WiMAX modem and the removably coupled second WiMAX modem. Also located within the apparatus 100 is a controller 112 that can be selectively coupled to one or more of the WiMAX modems and the Ethernet connection 108 depending on a variety of factors including hardware availability and user preferences. The controller 112 determines how the modems are utilized in transferring data between the computing device and the network-based information system, such as the Internet. In the embodiment discussed herein, the controller 112 can be coupled the first WiMAX modem 102, the second WiMAX modem 104, or both modems.

The apparatus 100 provides a network connectivity to one or more computing devices. The computing devices utilized in the present invention comprise a fixed computer and a portable computer. The term "fixed computer" is intended to include all types of computing devices that are designed to operate while stationary. Examples of fixed computers include, but are not limited to desktop computers in a home, school, community offices, or business or other computer-based devices such as cash registers, credit card authorization devices, and facsimile machines. The term "portable computer" is intended to include all types of computing devices that can operate in a stationary or mobile environment. Examples of portable computers include, but are not limited to, laptop computers and personal digital assistants (PDA).

Figure 3:
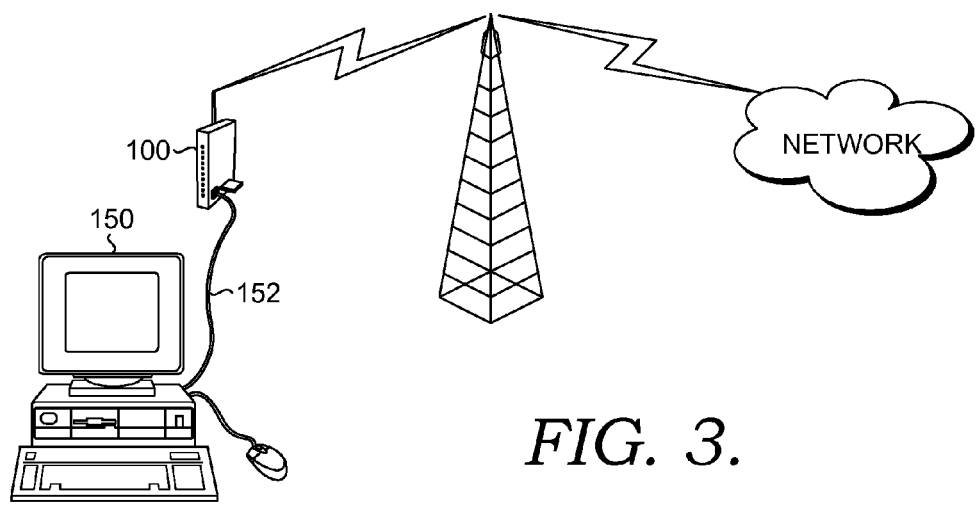
FIG. 3 is a schematic drawing of a network connection for a single computing device in accordance with an embodiment of the present invention.

The fixed computer can send data to the apparatus 100 or receive data from the apparatus 100 in multiple manners. In one embodiment, which is shown in FIG. 3, the fixed computer 150 is connected to the apparatus 100 by an Ethernet cable 152. In an alternate embodiment, the fixed computer 150 is coupled to the apparatus 100 through a wireless local area network or Wi-Fi. That is, the data is sent to and from the computer 150 wirelessly, thereby eliminating Ethernet cable 152.

Figure 4:
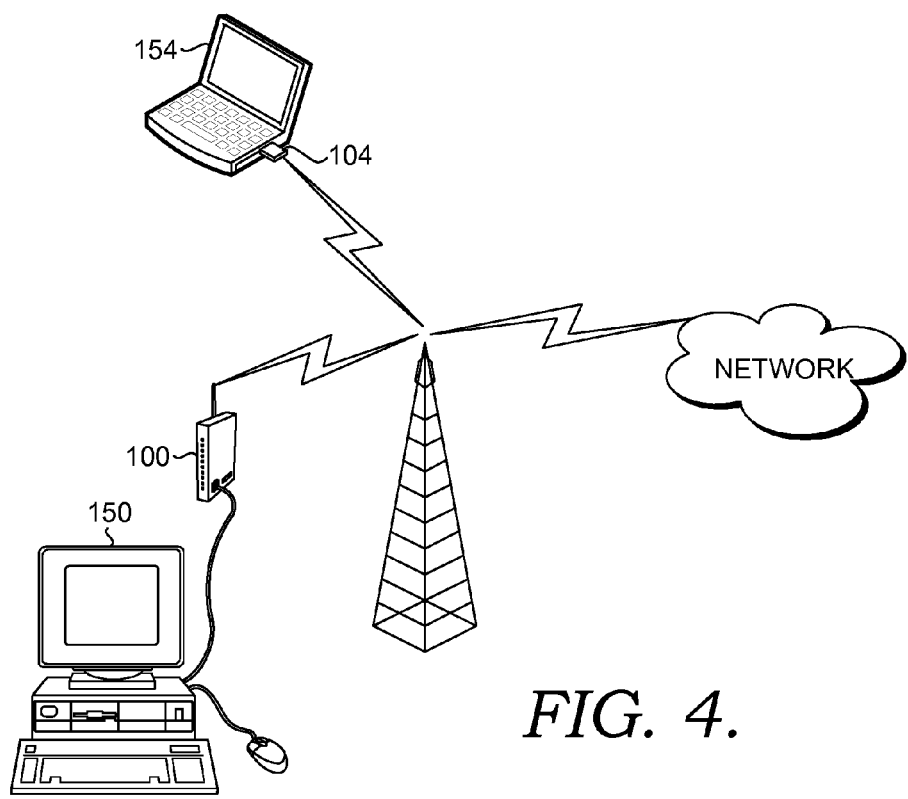
FIG. 4 is a schematic drawing of a network connection for multiple computing devices in accordance with an embodiment of the present invention.

Referring now to FIG. 4, the apparatus 100 provides network connectivity to at least one computing device. Note that in the discussion contained herein the at least one computing device refers to two computers, one fixed and one portable. However, the term is not meant to be limited to only two computing devices and can include more computers as would be found in a network-type environment.

The apparatus 100 can function with its first WiMAX modem 102 or also with the second WiMAX modem 104. The present invention also provides a method by which network connectivity is provided to multiple computing devices. Accordingly, with the arrangement of apparatus 100 (having a first WiMAX modem 102 located within the apparatus 100 and a second WiMAX modem 104 removably coupled to the apparatus 100), a first computing device 150 and a second computing device 154, the second computing device 154 is provided with the capability of connection to a network-based information system without disrupting the connection with the first computing device 150. To accomplish this type of network connection, the second WiMAX modem 104 is removed from the apparatus 100 and then inserted into the second computing device 154. Upon such installation, a connection between the second computing device 154 and the network-based information system is established through the second WiMAX modem 104.

Another aspect of the present invention is how the multiple WiMAX modems 102 and 104 can be utilized with respect to the apparatus 100. It has been discussed previously how the second WiMAX modem 104 can be removed without disrupting network connectivity with the fixed computer 150 through the first WiMAX modem 102. Additional features of the present invention will be discussed with reference to FIG. 5. Each of the modems 102 and 104 can operate independently or they can operate together.

As one skilled in the art understands, each modem operates on its own channel and has a media access control address (i.e. 10.10.10.11). The controller 112 can function to bond the channel of the first WiMAX modem 102 to the channel of the second WiMAX modem 104 so as to increase the bandwidth and the data transfer rate. That is, in an embodiment disclosed herein, the data transfer rate of the first WiMAX modem 102 is 10 megabits per second (mbps) while the second WiMAX modem 104 also provide data transfer at a rate of 10 mbps. Therefore, if the controller 112 bonds the channels of these two WiMAX modems together, such that packets of data traveling to and from the first WiMAX modem 102 and the second WiMAX modem 104 are separated and combined as needed by the controller 112, the effective data transfer rate can be up to 20 mbps. This is despite the face that the data would be sent or received across two modems, each having a unique channel. If, as previously discussed, the second WiMAX modem 104 is removed from the apparatus, then the effective data transfer rate of the apparatus 100 would be reduced by the capability of the second WiMAX modem 104, which for this embodiment is 10 mbps.

Figure 5:
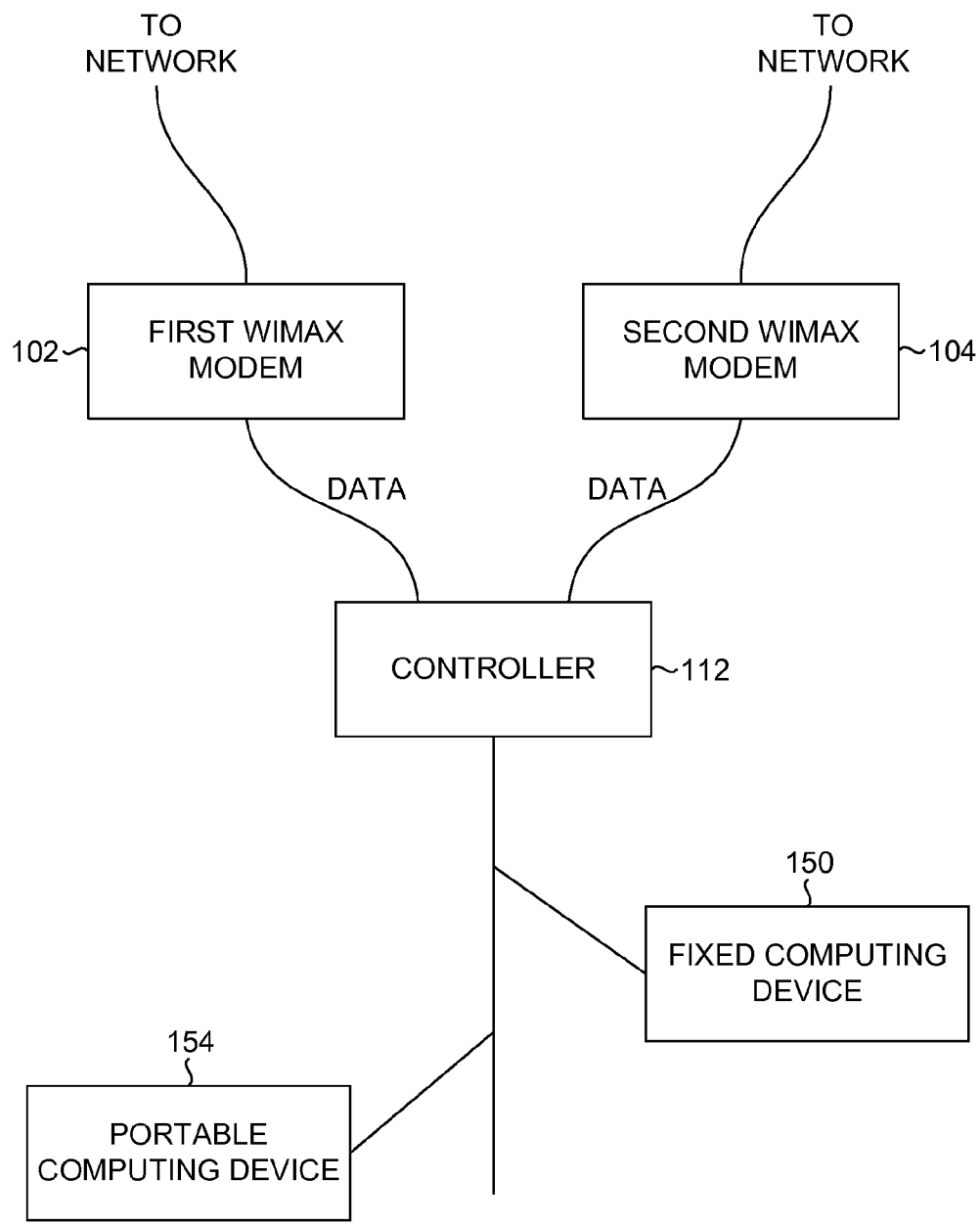
FIG. 5 is a schematic drawing depicting communication channels between multiple computing devices and a network-based information system.

In addition to channel bonding, the controller 112 can select to use one modem instead of the other modem. For example, if the first WiMAX modem 102, which is fixed within the apparatus, has a faster data transfer rate than the removably coupled second WiMAX modem 104, then the first WiMAX modem 102 may be selected for certain operations. Along the same lines, if the channels are bonded together for faster data transfer, the controller can opt to ratio the data transfer between the modems by directing a larger amount of data that is to be transmitted through one WiMAX modem and the remaining data through the other WiMAX modem. In the event that the modems have different data transfer rates, such a function optimizes the efficiency of the modems 102 and 104. Referring to FIG. 5, data transmitted from fixed computing device 150 can be split between the first WiMAX modem 102 and the second WiMAX modem 104 by the controller 112.

Another embodiment pertaining to the use of multiple WiMAX modems is with respect to data transmission security levels. In the event the user desires a secure data transmission channel, at least one of the modems can be configured for utilization of a secure data transmission channel. If both modems are not required for secure data transmission, the other WiMAX modem can be configured or remain configured as an unsecured data transmission channel. An example of such a split in configurations would be when the user is conducting sensitive financial transactions online involving personal data while at the same time downloading digital music files. The financial transactions would occur across the secure data transmission channel (through one of the first and second WiMAX modems 102 and 104) while the music file downloads would occur across the unsecured channel (through the other one of the first and second WiMAX modems 102 and 104).

It is also important to note that the multiple WiMAX modems provide redundancy to the apparatus 100 in the event one of the modems should fail. That is, if the second WiMAX modem 104 is coupled to the apparatus 100 and the first WiMAX modem 102 fails, network connectivity can continue through the second WiMAX modem 104, albeit at the data transfer capabilities of the second WiMAX modem 104.

Another function of the apparatus 100 is to provide a device capable of repeating a signal received from the network-based information system. For example, if data is received across the first WiMAX modem 102 from the network-based information system, and it is desired to wirelessly transmit this same data to another location, such as within a building, the data can be retransmitted from the second WiMAX modem 104.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having embodied thereon computer-useable instructions that, when executed by one or more processors, perform a method for communicating data between a computing device and a network-based information system via one or more of a first WiMAX modem and a second WiMAX modem that is removable, wherein the second WiMAX modem is unavailable when removed, the method comprising:

determining whether the second WiMAX modem is available;

when the second WiMAX modem is available, then communicating a first portion of the data over a first channel via the first WiMAX modem and communicating a second portion of the data over a second channel via the second WiMAX modem, wherein the first WiMAX modem and the second WiMAX modem communicate with the network-based information system via at least one antenna;

selectively bonding together the first channel and the second channel to increase bandwidth for communicating the data.

2. The media of claim 1, further comprising:

when the second WiMAX modem becomes unavailable while the first channel and the second channel are bonded together, then maintaining communication via the first WiMAX modem such that the data is communicated over the first channel without the increased bandwidth.

3. The media of claim 1, wherein the network-based information system is the Internet.

4. The media of claim 1, wherein the computing device includes a fixed computer or a portable computer.

5. The media of claim 4, wherein the computing device communicates with the one or more of the first WiMAX modem and the second WiMAX modem at least in part by way of an Ethernet cable.

6. The media of claim 4, wherein the computing device communicates with the one or more of the first WiMAX modem and the second WiMAX modem at least in part by way of a wireless local area network (Wi-Fi).

7. The media of claim 1, wherein one of the first and second WiMAX modems is configured for utilization of a secure data transmission channel and the other of the first and second WiMAX modems is configured for utilization of an unsecured data transmission channel.

8. The media of claim 1 wherein the data to be transmitted across the first and second WiMAX modems is apportioned between the first and second WiMAX modems so as to maximize the efficiency of each of the first and second WiMAX modems.

9. The media of claim 1, wherein the data is apportioned between the first and second WiMAX modems based on data transfer rates of the first and second WiMAX modems.

10. An apparatus for connecting a first computing device to a network, the apparatus comprising:

a first WiMAX modem located within the apparatus, wherein the first WiMAX modem is configured to connect the first computing device to the network over a first channel;

a second WiMAX modem removably coupled to the apparatus and configured to connect the first computing device to the network over a second channel when coupled to the apparatus;

a controller that can be selectively coupled to the first WiMAX modem and the second WiMAX modem, wherein the controller dynamically selects between using the first WiMAX modem or combining the first WiMAX modem and the second WiMAX modem to connect the first computing device to the network, wherein the combining includes apportioning communication data between the first WiMAX modem and the second WiMAX modem, and wherein during the combining, when the second WiMAX modem is removed, the first computing device remains connected to the network via the first WiMAX modem, wherein the first WiMAX modem and the second WiMAX modem communicate with the network via at least one antenna when the second WiMAX modem is coupled to the apparatus.

11. The apparatus of claim 10, wherein the second WiMAX modem is also configured to connect a second computing device to the network when removed from the apparatus and coupled to the second computing device.

12. The apparatus of claim 10, wherein the network is the Internet.

13. The apparatus of claim 10, wherein the computing device is in a fixed location.

14. The apparatus of claim 10, wherein the computing device is a portable computing device.

15. The apparatus of claim 10, wherein the controller is coupled to both the first and second WiMAX modems such that the computing device communicates with the network through an increased bandwidth resulting from bonding the first and second WiMAX modems together.

16. The apparatus of claim 10, wherein the communication data is apportioned between the first and second WiMAX modems to maximize efficiency of each of the first and second WiMAX modems.

17. The apparatus of claim 16, wherein the communication data is apportioned between the first and second WiMAX modems based on data transfer rates of the first and second WiMAX modems.

18. The apparatus of claim 10, wherein one of the first and second channels is a secure data channel and the other of the first and second channels is an unsecure data channel.

* * * * *